Dec. 4, 1956 E. H. HUGENHOLTZ 2,773,241

AUTOMATIC FREQUENCY CONTROL

Filed May 22, 1953 2 Sheets-Sheet 1

INVENTOR.
EDUARD HERMAN HUGENHOLTZ
BY [signature]
AGENT.

Dec. 4, 1956 E. H. HUGENHOLTZ 2,773,241

AUTOMATIC FREQUENCY CONTROL

Filed May 22, 1953 2 Sheets-Sheet 2

INVENTOR.
EDUARD HERMAN HUGENHOLTZ
BY
AGENT.

United States Patent Office 2,773,241

Patented Dec. 4, 1956

2,773,241

AUTOMATIC FREQUENCY CONTROL

Eduard Herman Hugenholtz, Hilversum, Netherlands, assignor to Hartford National Bank and Trust Company, Hartford, Conn., as trustee

Application May 22, 1953, Serial No. 356,701

Claims priority, application Netherlands May 27, 1952

7 Claims. (Cl. 332—19)

This invention relates to devices for generating oscillations modulated in frequency by a modulating voltage with the use of a high-frequency oscillator which is coupled to a frequency modulator controlled by an AFC-voltage, for automatic frequency stabilisation and, if desired, phase stabilisation of the oscillator voltage relatively to a higher harmonic of the frequency of a control voltage, the AFC-voltage being obtained by mixing the high-frequency oscillator voltage with stabilisation pulses of control-voltage frequency in a mixing stage acting as a phase detector which, normally, is cut off and is released only by the stabilisation pulses, the AFC-voltage being derived by way of an integrating network and a low-pass filter from the output pulses of the mixing stage.

It is known in devices of the kind described (cf. U. S. patent specifications application No. 52,342 (now abandoned), and Patent Nos. 2,691,095 and 2,691,139) that by suitable position modulation of the stabilisation pulses by means of a modulating voltage with the use of a phase modulator an angular modulation of the oscillator voltage results, which can be regarded as a frequency modulation and which corresponds to the frequency modulation of the stabilising harmonic of the stabilisation pulses. As compared with the modulation of the pulse repetition-frequency, said frequency modulation exhibits a frequency sweep which is increased in proportion to the ordinal number of the stabilising harmonic, the stability of the central frequency being determined by the frequency stability of the control voltage which is preferably crystal-controlled. Although the modulation of the pulse repetition-frequency in such devices may be small only, the possibility of a high ordinal number of the stabilising harmonic, for example from 50 to 200, permits of obtaining a broad-band frequency modulation of the voltage of the high-frequency oscillator at an extremely stable central frequency.

In such devices the AFC-voltage circuit including the integrating network and the low-pass filter is required to transmit the modulation frequencies evenly and substantially without frequency-dependent phase-shift, in order to realise identity of the frequency modulations of the oscillator voltage and the stabilising harmonic of the stabilisation pulses. However, since the proportioning of the filter networks in the AFC-voltage circuit is required to be chosen primarily in connection with the stability and the catching range of the AFC-circuit which in many cases is to be restricted to some kc./s. or sometimes even to some hundreds of cycles per second, an undesirable frequency variability with respect to modulation, especially at comparatively high modulation frequencies and more particularly when using frequency multiplex is frequently unavoidable.

The object of the invention is to mitigate or overcome the said disadvantages.

According to the invention, in devices of the kind mentioned in the preamble, the modulating voltage cascade is coupled, on the one hand, to a phase modulator for position modulation of the stabilisation pulses and, on the other hand, coupled independently of the AFC-circuit to the frequency modulator of the high-frequency oscillator.

The combination of the two steps provides a favourable modulation characteristic curve whilst avoiding frequency variability with modulation. It is to be noted that supplying the modulating voltage solely to the frequency modulator of the high-frequency oscillator causes, as a result of the frequency backcoupling brought about by the AFC-circuit, only narrow-band frequency modulation of the voltage of the high-frequency oscillator which is not serviceable in practice.

In order to obtain corresponding modulations of the voltage of the high-frequency oscillator and the stabilising harmonic, either an integrating network is required between the modulating voltage cascade and the phase modulator, or a differentiating network is required between the modulating voltage cascade and the frequency modulator.

The disadvantages mentioned in the foregoing are overcome almost completely by choosing the amplitudes of the modulating voltages supplied to the phase modulator and the frequency modulator respectively, to be such that independently of the AFC-circuit, the frequency modulations of the high-frequency oscillator and the harmonic of the stabilisation impulses stabilising the latter are at least substantially equal.

In order that the invention may be readily carried into effect, it will now be described with reference to the accompanying drawing, given by way of example.

Figure 1:
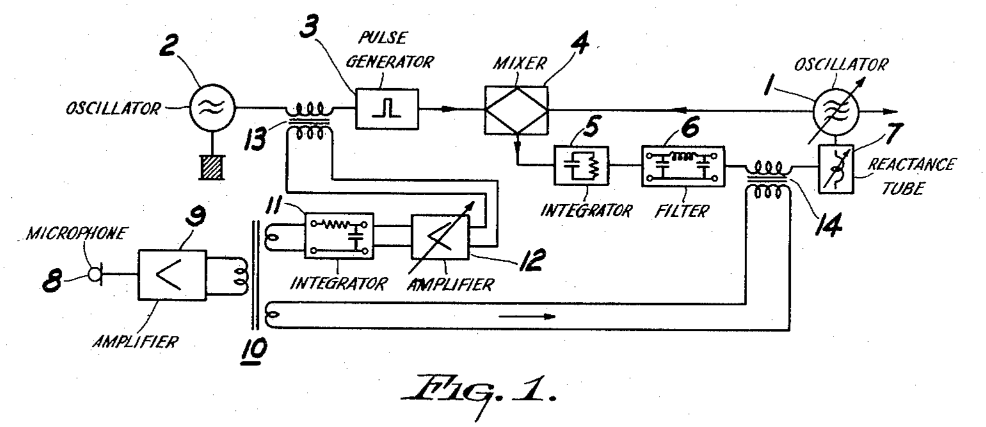
Fig. 1 shows in block diagram one embodiment of the invention.

In Fig. 1, reference numeral 1 indicates a high-frequency oscillator which is to be modulated in frequency and to be stabilised in central frequency. A sinusoidal control voltage serving for stabilisation is generated by a crystal-controlled oscillator 2 and supplied to a pulse generator 3, which supplies a stabilisation pulse each time when the control voltage supplied exceeds a given threshold voltage in the positive sense. Consequently, a single stabilisation pulse occurs during each cycle of the control voltage, so that the repetition frequency of the stabilisation pulses is equal to the control-voltage frequency.

The AFC-voltage serving for stabilisation in frequency and phase of the high-frequency oscillator 1 on a higher harmonic of the stabilisation pulses, which may be chosen by initial tuning of oscillator 1, is obtained by means of a mixing stage 4, which is active as a phase detector and to which the stabilisation pulses and the oscillator voltage are supplied. The mixing stage 4 has a biassing potential such that, normally, it is cut off and becomes active only during the occurrence of a stabilisation pulse. Said mixing stage thus supplies output pulses, the amplitude of which varies with the phase relation between the oscillator voltage and the stabilisation pulses. By integration of the output pulses with the use of an integrating network 5 and smoothing of the resultant pulses with the use of a smoothing filter 6, an AFC-voltage ensues which causes the oscillator voltage to be locked in frequency and phase on a higher harmonic of the stabilisation pulses if the said AFC-voltage is supplied to a reactance tube 7 coupled to the frequency-determining circuit of the oscillator 1. This locking can occur only if the frequency difference between the initial tuning frequency of oscillator 1 and the desired stabilising harmonic frequency is located within the catching range of the AFC-circuit. Said catching range is limited by the transmission range of the filters 5 and 6 included in the AFC-voltage circuit and may not be chosen unduly large in connection with stabilisation and selectivity requirements. For this reason the transmission range of the filters 5 and 6 is incertain cases only some hundreds of cycles per second and, as a rule, some kc./s. at the most.

In order to obtain an angular modulation of the stabilisation pulses which is to be regarded as a frequency modulation, the modulating voltage derived from a microphone 8 is supplied, superposed by means of a transformer 13 on the control voltage of oscillator 2, to the pulse generator 3 by way of a modulating voltage amplifier 9, a transformer 10, a network 11 for integrating modulating voltages, and an adjustable separating amplifier 12. The modulating voltage superposed on the control voltage of oscillator 2 brings about position modulation of the stabilisation pulses in conformity with the modulating voltage in a manner as will be described more fully with reference to Fig. 3. In so far the AFC-voltage circuit including the integrating network 5 and the low-pass filter 6 transmits the modulating voltage without attenuation and without frequency-dependent phase-shift, the high-frequency oscillator 1 now exactly follows the frequency modulation of the stabilising higher harmonic of the stabilisation pulses. However, the requirements which the networks in the AFC-voltage circuit have to satisfy in connection with the modulating voltage are in practice frequently not compatible with the requirements which the AFC-circuit has to fulfill in connection with the selectivity and stability thereof. In order to suppress said disadvantage, the modulating voltage is supplied by way of transformer 10, without the intermediary of the AFC-circuit, that is to say, by way of a transformer 14 in superposition on the AFC-voltage to the reactance tube 7. In this case the aim must be that the amplitudes and phases of the modulating voltages supplied to the phase modulator 13, 3 and the frequency modulator 7 are relatively chosen to be such that, independently of the AFC-circuit, the frequency modulations of the high-frequency oscillator 1 and the harmonic of the stabilisation pulses stabilising the latter are the same in amplitude and phase. In the said ideal case, the AFC-voltage circuit comprising the integrating network 5 and the smoothing filter 6, with the high-frequency oscillator stabilised, conveys solely an AFC-direct voltage instead of, as before, the modulating voltage. Consequently, the proportioning requirements which otherwise are imposed in connection with the transmission of the modulating voltage via the AFC-voltage circuit can now be neglected.

It may be mentioned here that deviations of the frequency modulation of high-frequency oscillator 1 relatively to the frequency modulation of the stabilising higher harmonic of the stabilisation pulses are corrected by way of the AFC-circuit and hence the AFC-voltage circuit then still conveys modulation-correcting voltages. A frequency-dependent attenuation and or phase shift of the modulation correcting voltages in the AFC-voltage circuit naturally results in the frequency modulation of high-frequency oscillator 1 being corrected only in part. The correction occurring is small with suitable construction of the frequency modulator 7, whilst otherwise the occurrence of correcting voltages does not detrimentally effect the extremely accurate stabilisation of the central frequency of oscillator 1.

Figure 2:
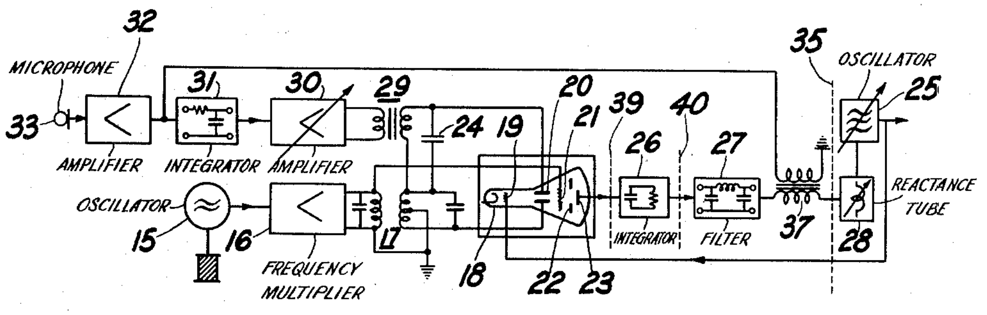
Fig. 2 shows a particularly advantageous modification of the embodiment of Fig. 1, modifications thereof being shown in Figs. 2*a*, 2*b*, and 2*c*, which comprises a special cathode-ray tube for generating the AFC-voltage, the operation of which will be explained with reference to the time diagrams *a* and *b* shown in Fig. 3.

Fig. 2 shows a particularly advantageous modification of the circuit shown in Fig. 1, in which a particular cathode-ray tube is used as a pulse generator, a mixing stage and a pulse-position modulator, the operation of which will be explained with reference to the diagrams *a* and *b* shown in Fig. 3.

In Fig. 2, reference numeral 15 indicates a crystal-controlled oscillator for generating a sinusoidal voltage of, for example, 100 kc./s. An amplifying and frequency-multiplying circuit 16, which is connected to oscillator 15, supplies a sinusoidal control voltage of 1 mc./s. to a tuned output transformer 17. The secondary transformer winding is provided with a grounded center tap, the control voltage $V_s$ which occurs at the winding being shown in diagram *a* of Fig. 3.

The device shown in Fig. 2 furthermore comprises a cathode-ray tube 18 (shown diagrammatically), in which an electron beam traverses successively an intensity-control grid 19, a pair of vertical deflection plates 20, a second intensity-control grid 21, and a masking electrode 22 having a horizontal slot-shaped aperture, the electron beam subsequently striking a collecting electrode 23. The deflection plates 20 are connected in push-pull to the secondary winding of the output transformer 17. The lower one of the deflection plates 20 is connected directly to one extremity of the transformer winding, whereas the upper one of the plates is connected by way of a coupling condenser 24 to the other extremity of the output winding. The control voltage of 1 mc./s. thus supplied to the deflection plates causes deflection of the electron beam in the vertical direction, so that it could pass through the horizontal slot in masking electrode 22 and strike collecting electrode 23 twice during each cycle of the control voltage, viz. at the moments when the control voltage $V_s$ in Fig. 3*a* passes through zero. A voltage which is shifted in phase by 90° relatively to the deflection voltage occurs at the primary circuit of output transformer 17, which voltage is applied to control grid 21 and suppresses the electron beam during the negative, half-waves of the said voltage. The electron beam is thus cut off by grid 21 during each second passage through zero of the control voltage $V_s$, a pulse occurring at the collecting electrode 23 only once during each cycle of the control voltage, viz. at the positive zero passages of $V_s$ as indicated by circles in diagram *a* of Fig. 3. The repetition frequency of the pulses occurring at the collecting electrode is thus 1 mc./s. The duration of the pulses may be varied by variation of the amplitude of the control-voltage $V_s$ and is, for example, 0.1 μsec. or less.

The output voltage of a high-frequency oscillator 25 which is to be stabilised on a high harmonic of the said pulse-repetition frequency, for example on 44 mc./s., is supplied to intensity-control grid 19 of the cathode-ray tube, thus bringing about an amplitude modulation of the pulses set up at collecting electrode 23. This amplitude modulation is dependent upon the phase relation between the oscillator voltage and the 44 mc./s. harmonic of the pulses of which harmonic the phase is determined by the 1 mc./s. control voltage. The amplitude-modulated pulses, after being integrated by means of an integrating network 26 and smoothed by a low-pass filter 27, provide an AFC-voltage suitable for control of a reactance tube 28 which is coupled to the high-frequency oscillator and serves to stabilise the frequency of high-frequency oscillator 25.

An angular modulation of the oscillator voltage stabilised in frequency by the control voltage may be effected as follows:

The circuit of the deflection plates 20 comprises, in addition to the output impedance 17 of the control-voltage source, an output transformer 29 which is connected in series therewith, of a separating amplifier 30, which is connected by way of a network 31 for integrating modulating voltages to a microphone amplifier 32 comprising a microphone 33. A modulating voltage as indicated by $V_m$ in diagram *a* of Fig. 3 occurs at the secondary winding of transformer 29, which winding is included in the deflection circuit and is shunted for the 1 mc./s. control voltage by capacitor 24. The frequency spectrum of the modulating voltage is naturally dependent upon the use envisaged. In case of transmission of a single call it is, for example, 200 to 3400 c./s.; in case of transmission of music, for example, 20 to 9000 c./s. and in case of transmission of a plurality of speech and/or music channels in frequency multiplex, for example, 0 to 48 kc./s. In all these cases the control-voltage frequency must be considerably higher than the highest modulation frequency and preferably at least the tenfold thereof.

Figure 3:
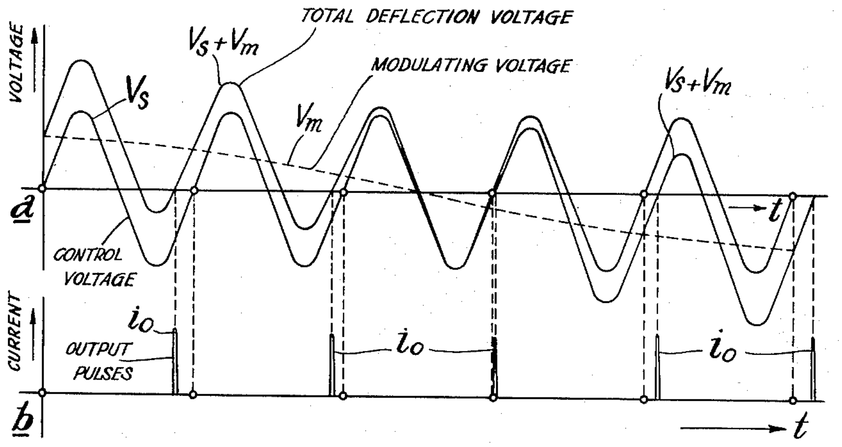

The total deflection voltage occurring at the deflection plates is the sum of the control and modulating voltages as indicated by $V_s+V_m$ in diagram *a* of Fig. 3 due to the voltages occurring in series in the deflection circuit. As before, the positive zero passages only of the deflection voltage bring about a current pulse at collecting electrode 23 of the cathode-ray tube. However, the moments of the zero passages and hence the position of the pulses $i_o$ in diagram *b* of Fig. 3 at the collecting electrode are now varied as compared with the moments indicated by the small circles in Fig. 3. The resultant pulses $i_o$ are modulated in position by the modulating voltage. The higher harmonics of the pulse-repetition frequency exhibit a variation in phase which increases in proportion to the ordinal number of the harmonic, that is to say a variation which is to be regarded as a frequency sweep, since the modulating-voltage cascade comprises an integrating network 31 in order to obtain frequency modulation instead of phase modulation. By integration of the pulses $i_o$ of diagram *b* of Fig. 3 with the use of a network 26, which in its simplest form is constituted by the parallel combination of a capacitor and a resistor, and by smoothing the voltage set up at the integrating network 26 a control voltage is obtained which is dependent upon the phase relation between the voltage of oscillator 25 and the control voltage $V_s$. This control voltage is suitable by means of a frequency corrector 28 to cause the frequency and the phase of high-frequency oscillator 25 to follow in frequency and phase a higher harmonic of the control voltage which may be chosen at will by initial tuning of oscillator 25.

The control voltage derived from the smoothing filter comprises the modulating voltage, so that on the condition that the whole frequency spectrum of the modulating voltage is transmitted evenly to the frequency corrector and the latter substantially has no inertia, the instantaneous frequency of high-frequency oscillator 25 exactly follows the instantaneous frequency of the stabilising component from the pulse spectrum. It may be mentioned here that the control voltage set up at the smoothing filter 27—apart from effects of second order—would not comprise the modulating voltage if both the positive and the negative zero passages of the deflection voltage would bring about pulses at the collecting electrode.

In order that the proportioning requirements of the AFC-voltage circuit in connection with the modulating voltages may be materially restricted or avoided in favour of a proportioning in connection with the stability and catching-range requirements of the AFC-circuit, the output voltage of microphone amplifier 33 is supplied without the intermediary of the AFC-circuit by way of a lead 34 and a transformer 37, in superposition with the AFC-voltage, to the reactance tube 28.

If a multigrid tube is used as a reactance tube, the AFC-voltage and the modulating voltage may be applied to several grids of this tube for the purpose of decoupling.

Figures 2A, 2B, 2C:
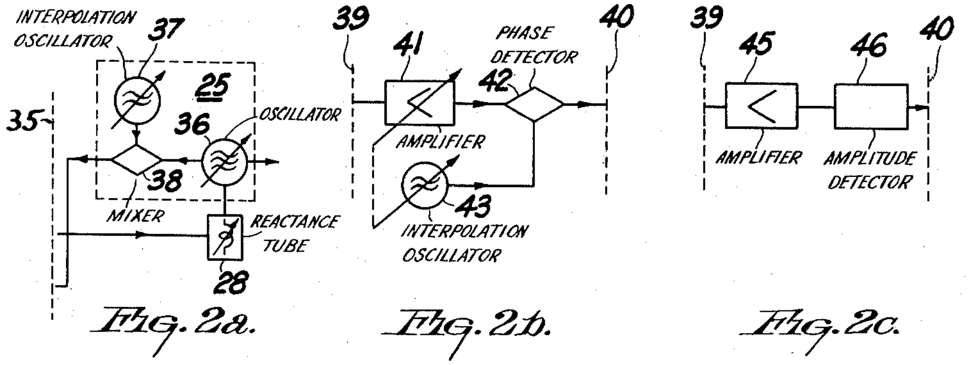

In the embodiments shown in Figs. 1 and 2, the direct voltage component, which is used as the AFC-voltage, is derived directly, by way of the networks 5, 6 and 26, 27 respectively, from the amplitude-modulated pulses occurring in the output of the pulse-mixing stage. However, as an alternative, for example, if an amplification between the pulse-mixing stage and the reactance tube must be used, the integrating network may be substituted for by an amplifier which is tuned to a low harmonic of the control-voltage frequency (for example 3 mc./s. at a control-voltage frequency of 1 mc./s.) and of which the output circuit is coupled by way of an amplitude detector to the input of the lowpass filter 6 or 27 which is included in the control-voltage lead. Such an arrangement is shown in Fig. 2*c*, in which the integrating network 26 of Fig. 2, or, alternatively, the integrating network 5 of Fig. 1, is replaced by an amplifier 45 which is coupled to an amplitude detector 46. The dotted lines 39 and 40 show exactly where this arrangement of Fig. 2*c* is to be connected in Fig. 2.

In the devices described it is also possible to maintain a determined frequency distance between the frequency of the controlled oscillator and a harmonic of the control-voltage frequency. If, for example, the control-voltage frequency is 1 mc./s. and the tuning range of the stabilised oscillator is, for example, from 40 to 60 mc./s., it may be desirable that either the oscillator 1 of Fig. 1, or the oscillator 25 of Fig. 2 should be stabilised on frequencies differing from harmonics of the control voltage, for example, on 40.2; 40.3; 40.4 mc./s., etc.

In order to make this possible, the part of the circuit located at the right-hand side of dotted line 35 in Fig. 2 may be substituted for by the circuit shown in Fig. 2*a*. The oscillator 25 is substituted for here by a composite oscillator, viz. a main oscillator 36, to which the reactance 28 is coupled, and an interpolation oscillator 37, which is tunable, for example, in steps of 0.1 mc./s. in a range between 0.1 and 0.4 mc./s. The frequency of the main oscillator 36 is now transposed by mixing the output voltage of interpolation oscillator 37 in mixing stage 38 to a frequency corresponding to a higher harmonic of the control-voltage frequency of oscillator 15 and hence, for example, from 40.3 mc./s to 40 mc./s. The transposed frequency thus obtained is supplied to, for example, the intensity-control grid 19 of cathode-ray tube 18 in Fig. 2.

When using the modification shown in Fig. 2*a*, it is desirable that the frequency of the main oscillator and the non-desired mirror frequency should be suppressed in the output circuit of mixing stage 38, in order to avoid interference. Under certain conditions, that is to say, at comparatively low interpolation frequencies, highly selective filter networks are required for this purpose.

Said difficulties may be obviated by utilising the modification shown in Fig. 2*b*, in which a determined frequency difference between the stabilised frequency and the stabilising harmonic of the control frequency is maintained. For this purpose the integrating network 26 located between the dotted lines 39 and 40 in Fig. 2 is substituted for by an interpolation stage as shown in Fig. 2*b*. This interpolation stage comprises an amplifier 41, which is tuned to, for example, 0.3 mc./s, 0.4 mc./s. or 1.3 mc./s., etc. and thereafter a mixing stage 42 which fulfills the function of a phase detector and which is connected to an interpolation oscillator tunable either continuously or in steps. A direct voltage component occurring in the output circuit of phase detector 42 is suitable to be used as an AFC-voltage after being smoothed with the use of a low-pass filter, for example, 27 of Fig. 2.

The amplifier 41 of the interpolation stage shown in Fig. 2*b* may be constructed as a narrow-band amplifier. The tuning of this amplifier is required to correspond to the tuning of interpolation oscillator 43 and, if desired, the tuning means of amplifier 41 and interpolation oscillator 43 may be coupled as shown diagrammatically in Fig. 2*b*. In case of sufficient selectivity of the low-pass filter 27 following after the interpolation stage and if the frequency range to be governed by interpolation is comparatively small, the amplifier 41 may be constructed as a broad-band amplifier with fixed tuning.

What is claimed is:

1. A stabilized frequency-modulation apparatus comprising a source of alternating control voltage, means for producing stabilization pulses at a repetition rate corresponding to the frequency of said alternating control voltage, a high-frequency oscillator for producing a high-frequency alternating voltage at a harmonic frequency of the frequency of said alternating control voltage, a frequency modulator coupled to said oscillator to control the frequency thereof, a mixing stage connected to receive and mix said stabilization pulses and said high-frequency alternating voltage and produce therefrom pulses forming an automatic frequency control voltage, said mixing stage being normally cut off and being released only upon the occurrence of said stabilization pulses, an automatic frequency control circuit comprising an integrating network and a low-pass filter, means for feeding said automatic frequency control voltage successively through said integrating network and low-pass filter and to said frequency modulator, a source of modulation voltage, a phase modulator connected to modulate the positions of said stabilization pulses in response to said modulation voltage, and means coupling said modulation voltage to said frequency modulator independently of said automatic frequency control circuit.

2. A device as claimed in claim 1, characterised in that the amplitudes of the modulating voltages supplied to the phase modulator and the frequency modulator, respectively, are relatively chosen to be such that, independently of the automatic frequency control circuit, the frequency modulations of the high-frequency oscillator and the stabilising harmonic of the stabilisation pulses are at least substantially equal.

3. A device as claimed in claim 1 characterised in that the integrating network comprises an amplifier which is tuned to a low harmonic of the control-voltage frequency, and an amplitude detector, the output circuit of said amplifier being coupled by way of said amplitude detector to the input of said low-pass filter included in the control-voltage circuit.

4. A device as claimed in claim 1, including a second mixing stage and an adjustable interpolation oscillator, characterised in that the high-frequency oscillator is coupled to the pulse mixing stage by way of said second mixing stage, said second mixing stage being connected to said adjustable interpolation oscillator.

5. A device as claimed in claim 1, characterised in that said integrating network comprises a phase detector stage, an amplifier connected to receive said automatic frequency control voltage pulses and tuned to an intermediate frequency, the output of said amplifier being connected to an input of said phase detector stage, and an adjustable interpolation oscillator providing an interpolation frequency connected to said phase detector stage, the output of the phase detector stage being connected to the input of the low-pass filter included in the control-voltage circuit.

6. Apparatus as claimed in claim 1, including an integrating network connected between said source of modulation voltage and said phase modulator.

7. Apparatus as claimed in claim 1, in which said means for producing pulses, said phase modulator, and said mixing stage comprise a cathode-ray tube containing an electron beam, a modulating electrode, a collecting electrode, and means for deflecting said electron beam with respect to said collecting electrode, means for feeding said alternating control voltage to said deflecting means, means for feeding said high-frequency alternating voltage to said modulating electrode, said automatic frequency control pulses being produced at said collecting electrode, and means for feeding said modulation voltage to said deflecting means in series with said control voltage.

References Cited in the file of this patent

UNITED STATES PATENTS

| | | |
|---|---|---|
| 2,470,892 | Hepp | May 24, 1949 |
| 2,611,083 | Arends | Sept. 16, 1952 |
| 2,662,214 | Hugenholtz | Dec. 8, 1953 |